United States Patent

[11] 3,602,881

[72] Inventors Robert T. Bayne;
G. Douglas Haville, both of Santa Barbara, Calif.
[21] Appl. No. 864,251
[22] Filed Sept. 3, 1968
[45] Patented Aug. 31, 1971

[54] AUTOMATIC TOLL CHARGING SYSTEM
6 Claims, 8 Drawing Figs.

[52] U.S. Cl. .................................................. 340/31
[51] Int. Cl. .................................................. G08g 1/07
[50] Field of Search ............................................. 340/31, 32, 38, 38 L, 38 P, 38 S; 343/6.5

[56] References Cited
UNITED STATES PATENTS

| | | | |
|---|---|---|---|
| 3,072,899 | 1/1963 | Kleist et al. ..................... | 340/31 |
| 3,231,854 | 1/1966 | Gran ............................. | 340/32 |
| 3,290,683 | 12/1966 | Norgorden et al. ............ | 343/6.5 |

*Primary Examiner*—Kathleen H. Claffy
*Assistant Examiner*—Randall P. Myers
*Attorneys*—Jerome B. Rockwood, Franklin D. Jankosky, Joseph H. Golant, Alfred B. Levine and Alan C. Rose

ABSTRACT: An automatic toll charging system including a vehicle-borne transponder with a toll charge counter and a ground installation including a transmitter triggered by the vehicle, a receiver, and signaling device allowing the vehicle to proceed if a toll has been charged. The vehicle-triggered signal from the ground transmitter is received by the vehicle transponder, whereby the toll charge counter is stepped to indicate charging of a toll, and a signal is transmitted from the transponder. The transponder signal is received by the ground receiver, and the vehicle is allowed to proceed. The transponder counter may be set to store a number of prepaid tolls, subtracting one for each passage, or may count the tolls used for later payment.

PATENTED AUG 31 1971

INVENTORS:
Douglas Haville
Robert T. Bayne

AGENT

INVENTORS:
G Douglas Haville
Robert T. Bayne

AGENT

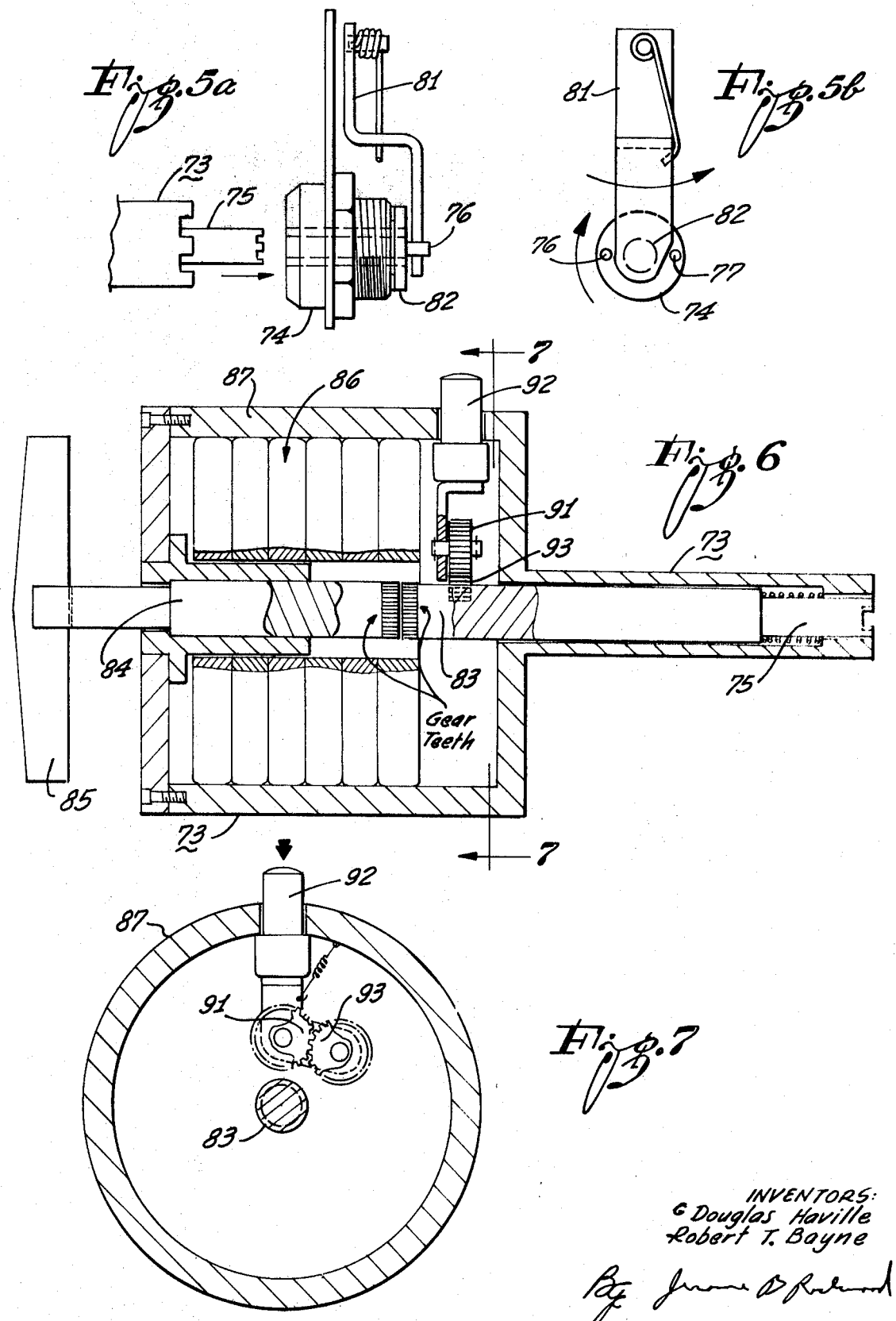

AUTOMATIC TOLL CHARGING SYSTEM

The present invention relates to an automatic toll charging system and more particularly to a toll charging system enabling bridge or highway tolls, parking, or other fees levied on vehicles to be collected without requiring the vehicle to stop.

Toll charging systems heretofore known in the art have required halting of the vehicle in order to pay the toll. On highways and bridges, for example, there may be a toll gate where the driver is required to deposit the required toll before being allowed to proceed. In other systems, a card or ticket is issued upon entrance of the vehicle into a system with an indication printed thereupon of the point of entry. At the exit, the required toll is computed and the driver is required to pay the computed toll before being allowed to proceed. As will be apparent, all such prior art systems have required that the vehicle stop. Further, cash is collected at a plurality of toll collection points, raising accounting problems and readily enabling possible pilferage. More importantly, requiring all vehicles to halt decreases the effective traffic handling capacity of the bridge or highway. If vehicles can maintain speed, more vehicles per hour can be handled by a given number of traffic lanes. In addition, the system of the present invention enables tolls to be prepaid, similar to a railroad commutation ticket, or, conversely, toll charges may be accumulated for a given period of time, and then paid in a manner similar to that employed by gasoline credit cards.

In the present invention, a radio transmitter interrogator at a toll collection point is triggered by an approaching vehicle to emit a pulse. A transponder in the vehicle receives the transmitted pulse, indicates the charging of a toll, and transmits a pulse to a ground receiver indicating that a toll has been charged. The ground receiver in response to the pulse from the transponder may raise a barrier or change a traffic light from red to green, thereby enabling the vehicle to proceed.

It is, therefore, an object of this invention to enable charging a moving vehicle with a toll.

Another object of this invention is to provide an automatic toll charging system wherein a vehicle-borne transponder stores toll charges and transmits a clearance signal upon receipt of a signal from a ground station.

Another object of this invention is to provide an automatic toll charging system which is simple, reliable and inexpensive to build and operate.

These and other objects and advantages of the present invention will become apparent from the following description and accompanying drawings, wherein:

FIGS. 5a and 5b illustrate the prepaid toll-inserting key and lock where FIG. 5a is a side view and FIG. 5b is a rear view;

FIG. 6 is a cross section of the key; and

FIG. 7 is a section taken along line 7—7 of FIG. 6.

Figure 1:
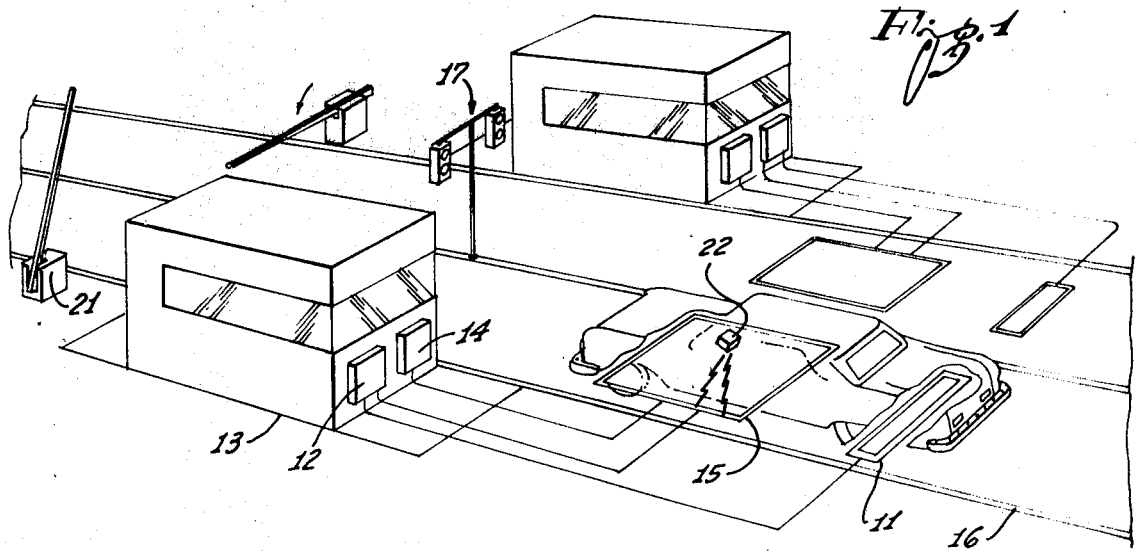
FIG. 1 illustrates the toll charging system of the present invention.

Referring now to the drawings, and particularly to FIG. 1 thereof, a typical automatic toll collection installation is illustrated. A trigger, such as treadle plate 11 is actuated by an automobile. Treadle plate 11 is connected to a ground transmitter or interrogator 12, conveniently mounted at toll booth 13. Interrogator 12 and a receiver 14 are connected to a loop antenna 15. Both treadle plate 11 and loop antenna 15 are suitably embedded in the roadway 16. A traffic light 17 and a barrier 21 may be provided to stop the vehicle if a toll has not been charged, as by entry of a vehicle into the system not equipped with a transponder 22, or having an exhausted transponder 22. The barrier is lifted, allowing the vehicle to proceed if a toll has been charged. The transponder 22 may be conveniently mounted on the dashboard of the vehicle.

Similar installations are provided for each traffic lane of a highway. At the toll collecting point illustrated in FIG. 1, two installations are provided, one for each traffic lane.

Figure 2:
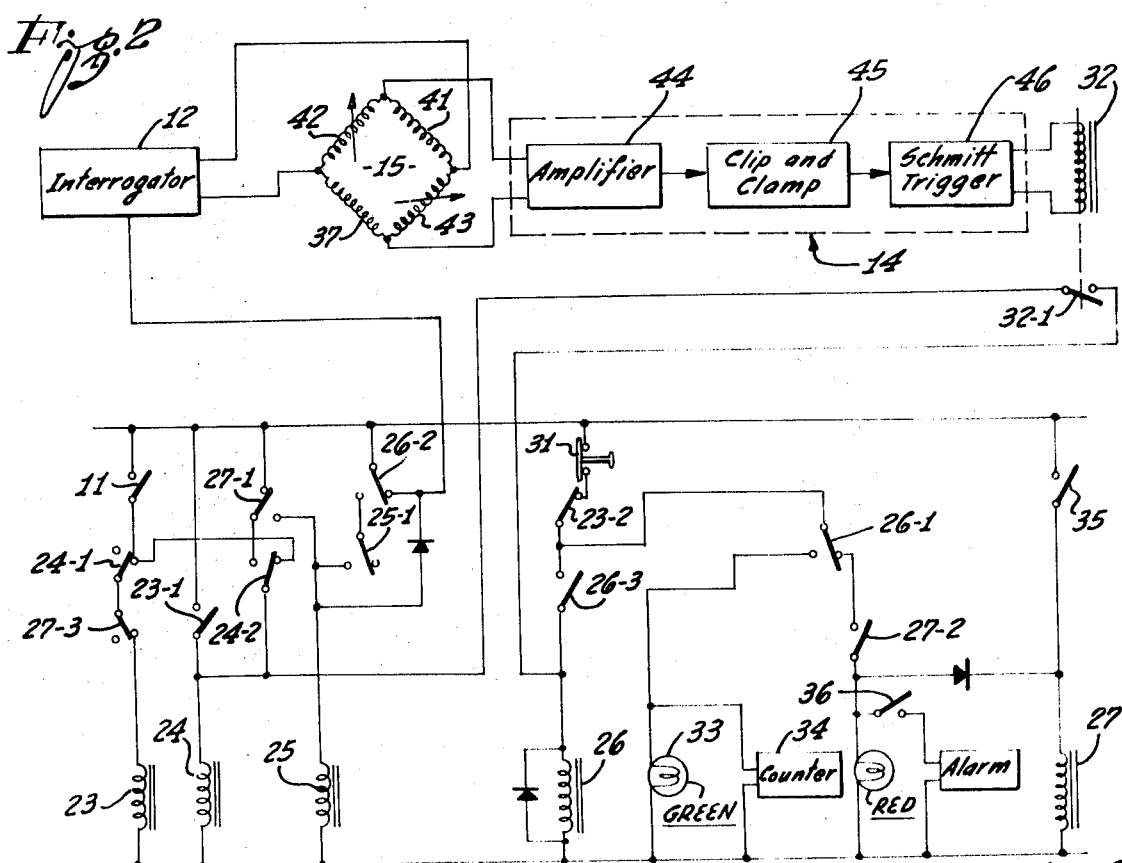
FIG. 2 is a schematic diagram of the ground equipment of the present invention as installed at a bridge or highway toll gate.

Referring now to FIg. 2, the ground installation at a toll collecting station is schematically illustrated. A vehicle closes the treadle switch 11, thereby energizing relay coil 23 and closing contact 23-1, thus energizing relay coil 24. Relay coil 24 locks itself up through closed contacts 27-1. Actuated relay 23 also resets relay 26 if the manual reset switch 31 had not previously been pushed. If a signal indicating a toll has been charged in transponder 22 is received by receiver 14, relay 32 is energized and relay contact 32-1 is closed. This closes the circuit energizing relay coil 26, through closed contacts 23-1. Relay 26 locks itself up through contact 26-3, and also turns on a green light 33 through contact 26-1, and energizes the toll counter 34. Relay coil 26 when energized turns off the interrogator 12 by opening contact 26-2. Relay coil 27 is energized by a switch 35. Switch 35 may be a photoelectric switch or treadle switch sensing a vehicle adjacent the toll house 13. Contact 27-1 of relay 27 in turn energizes relay coil 25, which locks up through contacts 26-2 and again turns the transmitter back on. The transmitter is turned off when the toll has been received to prevent double triggering. If a signal indicating a paid toll has not been received, relay 32 would not be energized, and contact 32— -1 would remain open when switch 35 was actuated. Relay 27 would then energize the red light and the alarm through the contact 26-1. The alarm may be cutout of the circuit by a manual switch 36, or may be canceled by reset switch 31.

Upon closure of treadle switch 11, interrogator 12 is energized and applies a signal to bridge loop antenna 15. Bridge loop antenna 15 includes two separate antenna loops 37 and 41, with the winding sense as indicated in FIG. 2. Since it is desirable to transmit and receive simultaneously, the interrogator and receiver are both connected to the antenna loop system. While the transmitted frequency, conveniently 17 kilocycles, differs from the received frequency, conveniently 7 kilocycles, the received signal from the vehicle-borne transponder is much weaker than the amplitude of the transmitted signal in the loop. Blocking of receiver 14 by the interrogator must be prevented. To accomplish this the receiver is placed in a bridge consisting of the two halves 37 and 41, of the ground loop, and two balance inductors. Interrogator 12 is connected across the two opposite legs of the bridge, as illustrated in FIG. 2. The polarity of antenna loops 41 and 37 are indicated by dots in the drawing. The flux of both loop 41 and loop 37 are aiding in the direction of transmission and are also aiding in the direction of reception. Inductors 42 and 43 have a value so that when the transmitter is on, the bridge junctions to which the receiver is connected are at a null at the transmitter frequency. With the receiver at a null at the transmitter frequency, the bridge antenna loops 37 and 41 at the received frequency are aiding, and the receiver sees both loop 41 and loop 37 as generators in parallel with the impedances of inductances 41 and 43, respectively. With this connection, the voltage at the receiver is only one half as large as if loops 41 and 37 were in series. However, the impedance of loops 41 and 37 is much less in the bridge connection, and provides a more suitable impedance match for use with a transistor circuit.

The receiver 14 includes a tuned amplifier 44, a clip and clamp circuit 45 and Schmitt trigger circuit 46. Amplifier 44 is tuned to the received frequency of 7 kilocycles. The clip and clamp circuit 45 is provided so that at low level signals will not be conducted, thereby eliminating extraneous noise which may erroneously trigger a toll paid signal. The clamping function simply serves to set the upper level of a received signal so that it stays within the normal capabilities of the following Schmitt trigger circuit. The Schmitt trigger circuit 46 has two stages. The first stage is normally on and is turned off by the output of the clip and clamp circuit. The second stage of the Schmitt trigger contains relay coil 32 for signaling the relay circuit that a fare has been paid. When the output of the clip and clamp circuit 45 makes the first stage of the Schmitt trigger go into cutoff, the second stage of the Schmitt trigger 46 goes into clamp, energizing the relay 32.

Figure 3:
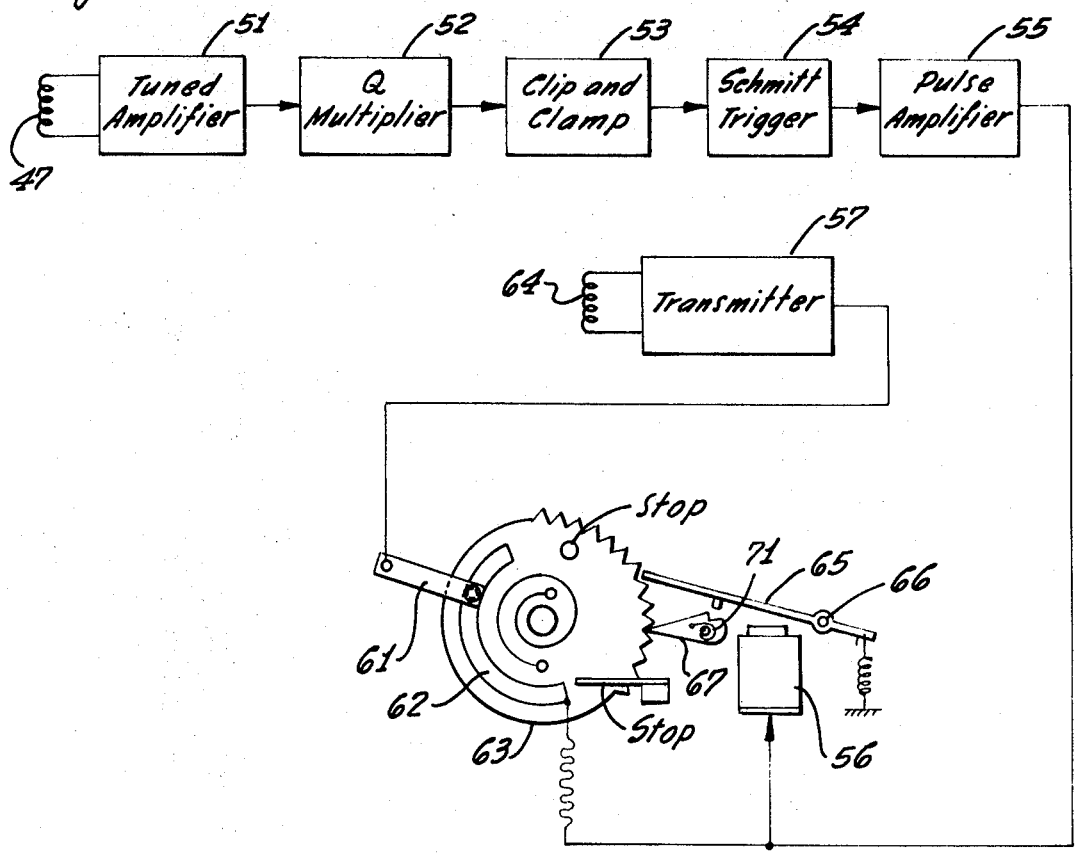
FIG. 3 is a schematic diagram of the vehicle-borne transponder.

The vehicle-borne transponder is illustrated in FIG. 3. A receiver loop antenna 47 is connected to a tuned amplifier 51, tuned to the 17 kilocycle signal transmitted by the interrogator 12. The tuned amplifier 51 is connected to a Q multiplier enabling a sharper response curve. The received signal is then applied to a clip and clamp circuit 53, which functions in a manner similar to the clip and clamp circuit 45 in the ground receiver disclosed hereinabove. Schmitt trigger circuit 54 also functions in a manner similar to the Schmitt trigger 46 in the ground receiver. However the output of Schmitt trigger 54 is applied to a pulse amplifier 55. The amplified pulse from pulse amplifier 55 then energizes escapement magnet 56. The pulse from pulse amplifier 55 is also applied to transmitter 57 through wiper switch 61 and wiper section 62 on memory wheel 63. In the embodiment illustrated, prepaid tolls are inserted into memory wheel 63 by winding the wheel the required number of steps by a means to be disclosed hereinbelow. If there are tolls remaining on the memory device, the pulse traverses the wiper and actuates the transmitter. The transmitter emits a signal through transmitter antenna loop 64 back to the stationary bridge loop 15, thereby confirming that an interrogating signal has been received and a toll deducted from the number stored in memory wheel 63. When the bridge toll memory device is triggered, the pulse from pulse amplifier 55 is applied to escapement magnet 56. Escapement lever 65 is attracted by magnet 56. Lever 65 is rotated about pivot point 66 and applies a torque to the toothed section of wheel 63. Simultaneously, latch 67 is rotated clockwise about axis 71 by lever 65 so that wheel 63 is stepped. The number of steps on the memory wheel 63 correspond to the number of tolls which are storable in the memory system. Since the wheel 63 does not move until the escapement is relaxed, there is one more tooth position than there are switch positions on the wheel. Therefore, the last position of the memory wheel does not have a switch position for the wiper switch 61. Since on the last, or zero toll position the wiper switch is open, no pulse will be applied to transmitter 57, and the transmitter will not transmit a confirming signal to the loop in the ground. Consequently a no toll paid signal will be given to the relay logic circuit in the ground control system.

Figure 4:
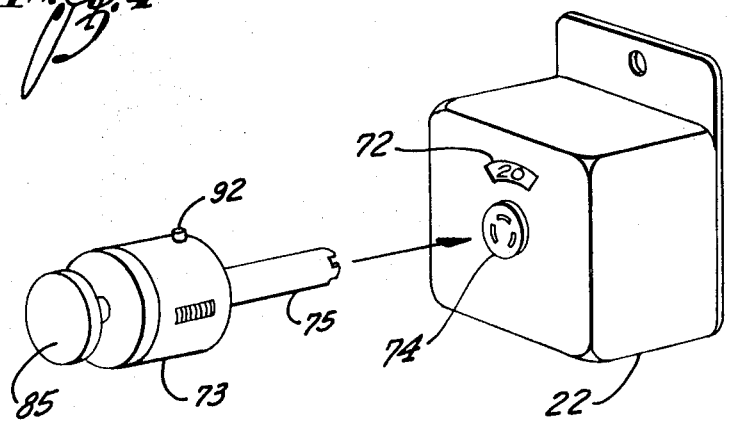
FIG. 4 illustrates the transponder unit and the cooperating key device for inserting a predetermined number of prepaid tolls.

The vehicle-borne transponder 22 is pictorially illustrated in FIg. 4 The numerals indicating the number of tools remaining are displayed through window 72. In a preferred embodiment of this invention the tolls are prepaid and inserted into the memory device by means of a circular key 73, cooperating with a lock 74 on the transponder box. Keys may conveniently be placed in the hands of cashiers at convenient spots, where a number of tolls are inserted in the transponder memory wheel upon payment of the required fee.

Referring to FIG. 5, the circular key 73 is inserted into lock 74. The inner shaft 75 of key 73 is rotated and winds memory wheel 63. Inner shaft 75 is illustrated in the extended position in FIG. 5A. As will be apparent, circular keys will fit only if the lock is tumblered to match the key. Lock 74 on its inner side has mounted thereupon pins 76 and 77. Rotation of lock 74 forces pin 76 against a spring loaded leaf 81. Leaf 81 is normally locked in blocking position by means of pins 76 and 77. However rotation of lock 74 rotates pins 76 and 77, effectively removing pin 77 and allowing pin 76 to rotate leaf 81 from its position blocking aperture 82 of lock 74. Inner shaft 75 is thus enabled to penetrate aperture 82 and rotate memory wheel 63.

The structure of key 73 is further illustrated in FIGS. 6 and 7. Inner shaft 75 is spring loaded and is fabricated in two sections, 83 and 84. The adjacent ends of shafts 83 and 84 have gear teeth cut around the circumference thereof. The external end of shaft 84 has a knob 85 secured thereto. A conventional mechanical revolution counter 86 is mounted within case 87 preferably concentric with shaft 75. To insert a predetermined number of tolls into the memory wheel of transponder 22 the outer shaft is inserted into the lock and rotated, removing leaf 81 from blocking position, as disclosed hereinabove in connection with FIG. 5. Knob 85 is then pushed to enable engagement of inner shaft 75 with the memory wheel. As inner shaft 75 moves to the right, the gear teeth on the two sections, 83 and 84, of inner shaft 75 are brought into engaging position adjacent gear 91. Unlock button 92 is depressed, engaging gear 91 with the gear teeth of the adjacent ends of shaft sections 83 and 84. Shaft sections 83 and 84 are thereby effectively locked together, rotating as a solid shaft. Knob 85 is rotated by the operator to insert the required number of tolls into transponder 22. The counter 86 is rotated by a counter gear 93, permanently engaged with gear 91. Thus, rotation of knob 85 rotates gear 91, which in turn rotates shaft section 83 and simultaneously engages counter gear 93, enabling counter 86 to record the number of tolls that are inserted into the transponder.

It is to be clearly understood that the embodiment of the present invention disclosed hereinabove is for the purpose of illustration only, and that this invention includes all modifications and improvements falling within the scope and spirit of the appended claims.

What is claimed is:

1. A toll charging system comprising:
   an interrogator at a toll charging point,
   a vehicle-borne transponder including a vehicle receiver actuated by said interrogator, counting means and a transmitter, said vehicle receiver actuating said counting means and said transmitter,
   a ground receiver at said toll charging point responsive to said transmitter,
   means connected to said ground receiver indicating charging of a toll and,
   vehicle actuated means connected to said interrogator to trigger said interrogator and transmit a signal.

2. In the toll charging system of claim 1,
   normally actuated passage denial signal means and normally off passage allowance signal means;
   switching means connected to said ground receiver to turn off said passage denial signal means and actuate said passage allowance signal means upon receipt of a toll charge indicating signal from said vehicle transponder.

3. In the toll charging system of claim 2, antenna means connected to said interrogator and to said ground receiver including:
   first and second antenna loops;
   first and second inductors;
   a bridge circuit including said first and second antenna loops and said first and second inductors; and
   means connecting said interrogator and said ground receiver to said bridge circuit.

4. In an automatic toll charge system, a vehicle-borne transponder comprising:
   a receiver responsive to a signal indicative of a demand for the collection of a toll charge,
   a toll charge counter connected to said receiver,
   means adapted to insert a predetermined number which represents an amount of toll chargers in said counter, and means adapted to subtract one toll charge from the amount upon the receipt of a signal from the receiver,
   a transmitter and,
   means enabling energization of said transmitter responsive to actuation of said counter.

5. In the vehicle-borne transponder of claim 4, said counter including:
   a spring loaded step wheel;
   means for stepping said step wheel to indicate a toll charge upon receipt of a signal by said transponder receiver; and
   means for winding said step wheel and tensioning said spring to store prepaid toll charge.

6. An automatic system for acknowledging charging of admissions from vehicles moving past a collection point comprising:

means located other than on the vehicle for acknowledging receipt of a fare,
vehicle fare storage means having a fare balance capable of modification by means located other than on the vehicle so long as a fare balance remains,
sensing means responsive to fare collection for actuating a device located other than on said vehicle in response to a fare balance modification.